United States Patent [19]

Desjardins et al.

[11] Patent Number: 4,895,271
[45] Date of Patent: Jan. 23, 1990

[54] CONTAINER WITH CLOSURE STAY

[75] Inventors: Jacques R. Desjardins; Gordon P. F. Clark; Frederick H. Gill, all of Quebec, Canada

[73] Assignee: Northern Telecom Limited, Montreal, Canada

[21] Appl. No.: 256,932

[22] Filed: Oct. 13, 1988

[51] Int. Cl.⁴ ............................................. B65D 43/24
[52] U.S. Cl. ..................................... 220/335; 16/319; 16/349; 16/352
[58] Field of Search ...................... 220/335, 342, 343; 16/50, 82, 85, 319, 326, 327, 349, 352, DIG. 17, DIG. 21, DIG. 32, DIG. 37

[56] References Cited

U.S. PATENT DOCUMENTS

| | | | |
|---|---|---|---|
| 821,861 | 5/1906 | Croft | 16/352 |
| 1,456,574 | 5/1923 | Roberts et al. | 16/349 X |
| 2,848,783 | 8/1958 | Keller, Jr. et al. | 16/352 X |
| 3,073,025 | 1/1963 | Yatsko | 16/327 X |
| 3,286,300 | 11/1966 | Altemiller | 16/326 |
| 3,355,088 | 11/1967 | Young | 220/342 X |
| 3,385,422 | 5/1968 | Lowry | 220/342 X |
| 3,423,784 | 1/1969 | Reynders | 16/82 |
| 3,629,900 | 12/1971 | Beerli, Jr. | 16/349 |
| 3,811,150 | 5/1974 | Chalmers | 16/352 |
| 4,795,065 | 1/1989 | Ashizawa et al. | 220/335 X |

Primary Examiner—Stephen Marcus
Assistant Examiner—Nova Stucker
Attorney, Agent, or Firm—R. J. Austin

[57] ABSTRACT

A cabinet with a closure door having a rigid stay for holding the door in an open position. The stay is basically U-shaped and is pivotally held upon a body of the cabinet to be located around hinged together side walls of the body and door in the door open position. As the stay lies up against these side walls, it does not obstruct any access space into the body and it also holds the door with its closure surface directly facing the operator to enable him to maintain equipment upon the door also.

2 Claims, 2 Drawing Sheets

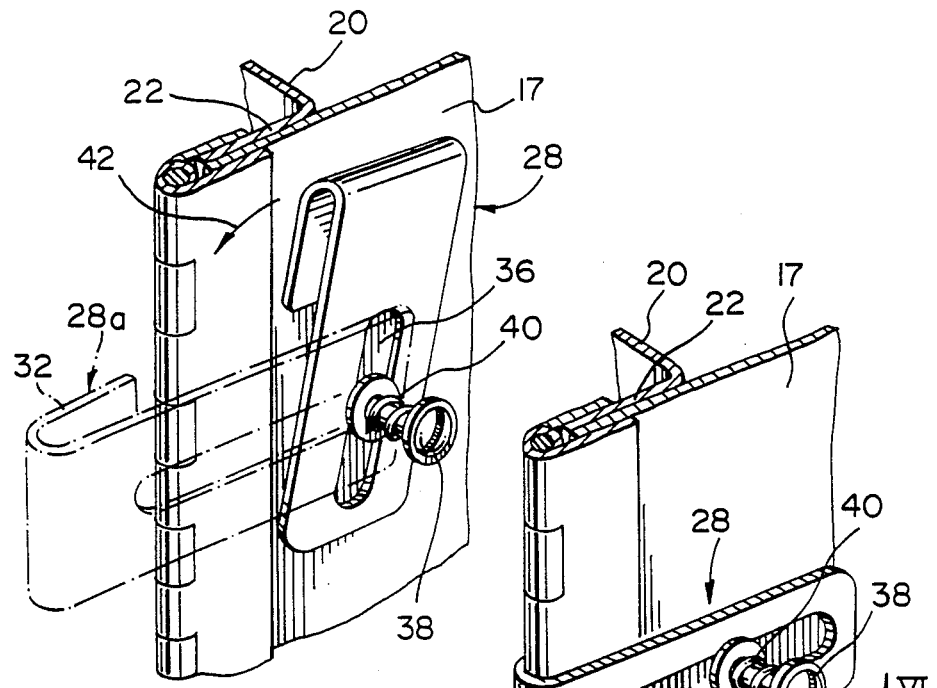
FIG. 4
FIG. 5
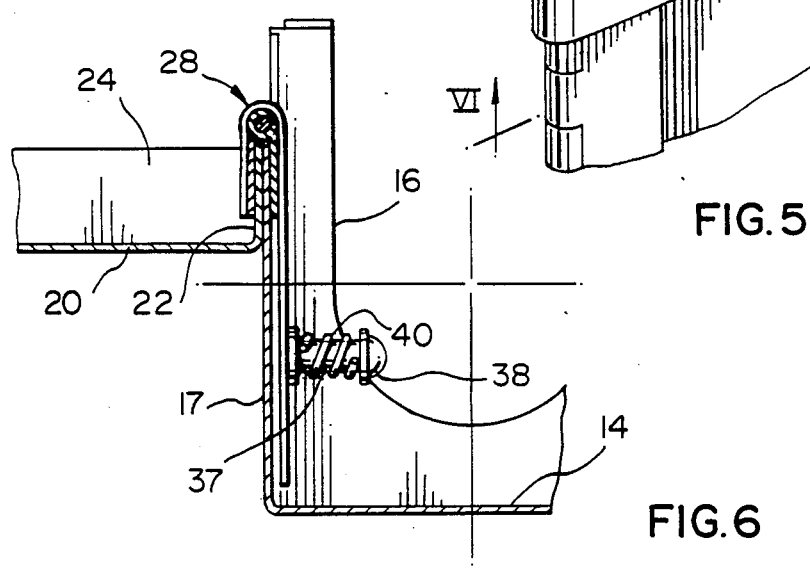
FIG. 6

CONTAINER WITH CLOSURE STAY

This invention relates to containers having closure stays.

Closures of containers may be hinged to bodies of the containers. Certain containers, referred to as cabinets, are for location in fixed positions with the closures hinged upon the cabinet bodies about vertical axes. Such is the case with certain constructions of cabinets used for electrical or telecommunications purposes, for instance as terminal boxes or fuse boxes to be located upon the walls of buildings. In such boxes, access holes are normally provided in a wall or walls of each box for entrance and/or exit of a cable and, within the boxes, electrical connections are made between the cable and conductors extending from the box to various terminals or electrical access points of a building.

A problem which exists with such a container is that to allow for complete accessibility to the inside of the container for electrical assembly or maintenance purposes, its hinged closure needs to be moved completely away from a frontal opening to the container. Various types of stays are known and used for this purpose, but their design is such that they are apt to extend across and limit accessibility through the frontal opening.

The present invention provides a container having a stay for a hinge closure which minimizes or avoids the above disadvantage.

According to the present invention, a container is provided which has: a body comprising side walls defining an opening; a closure having a closure wall and at least one side wall extending from the closure wall, the side wall of the closure and a side wall of the body hingedly connected together about a hinge axis to enable the closure to move between a closed pivotal position in which the closure wall covers the opening to the body and an open pivotal position in which the closure is hinged away from the opening to the body; and a rigid stay operative for retaining the closure in said open pivotal position, the stay having two legs extending in spaced relationship from a base of the stay and the stay locatable in an operative position when the closure is in its open pivotal position with the hinged together side walls of the body and closure disposed between the two legs of the rigid stay.

With the above container according to the invention, the stay lies completely in the region of the hinged together side walls when the stay is in its operative location so as to be positioned to one side of the opening to the container body and not limit access through the opening. Because the stay is rigid, when it is in its operative location with the two hinged together side walls disposed between the legs of the stay, then it is impossible to provide relative hinging movement of the side walls for the purpose of moving the closure to its closed pivotal position.

In the invention, a simple rigid stay structure is provided which achieves the object of not limiting accessibility through the frontal opening. The stay may be movably retained upon one of two hinged together side walls for movement into and out of its operative location. For this purpose the rigid stay may be slidably and pivotally mounted upon one of the two side walls.

According to a further aspect of the invention there is provided a container having: a body comprising side walls defining an opening; a closure having a closure wall and at least one side wall extending from the closure wall, the side wall of the closure and a side wall of the body hingedly connected together about a hinge axis to enable the closure to move between a closed pivotal position in which the closure wall covers the opening to the body and an open pivotal position in which the closure is hinged away from the opening to the body; and a rigid stay operative for retaining the closure in said open pivotal position, the stay being U-shaped with two legs extending in spaced relationship from a base, the stay locatable in an operative position when the closure is in its open pivotal position with the base of the stay extending partly around the hinge axis and with the legs of the stay disposed one on each side of the two hinged together side walls.

One embodiment of the invention will now be described by way of example, with reference to the accompanying drawings, in which:

FIG. 4 is an isometric view of part of the container, in the same direction as and to a larger scale than that shown in FIG. 1, to show the movement of the rigid stay into and out of an operative position;

FIG. 5 is a view similar to FIG. 4 showing the rigid stay in its operative location; and FIG. 6 is a cross-sectional view taken along line VI—VI in FIG. 5.

Figure 1:
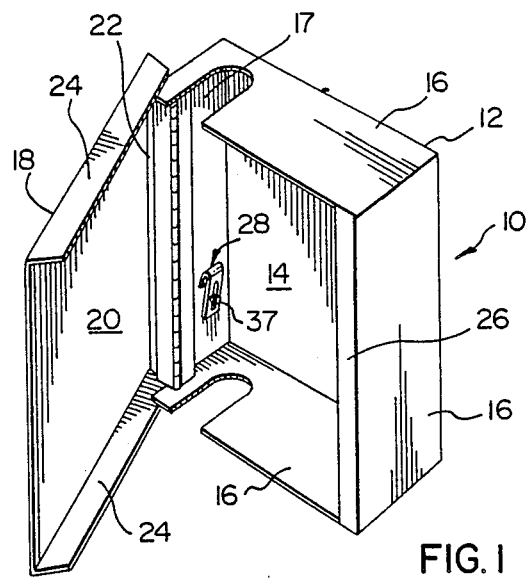
FIG. 1 is an isometric view of a container showing a closure in a partially open position.

In the embodiment as shown in FIG. 1, a container 10 is a cabinet used for electrical or telecommunications purposes such as a terminal or fuse box for location upon the wall of a building. The cabinet comprises a body 12 having a base 14, three side walls 16 and a fourth side wall 17 extending outwardly from the base and defining a frontal opening to the body spaced from the base. The cabinet also comprises a closure 18 having a closure wall 20, a side wall 22 disposed along one edge of the closure wall 20, and two further side walls 24 extending from two side edges of the closure wall 20 lying adjacent to the side wall 22. The closure 18 is attached to the body 12 by a hinged connection between the side wall 22 and the side wall 17 of the body. The side wall 17 extends a shorter distance from the base 14 than the side walls 16 (see FIGS. 1 and 6). The dimensions of the closure and body are such that in the closed position of the cabinet, the side walls 24 lie outside of opposite side walls 16 of the body. In addition, the edge of the closure 18 remote from the side wall 22 is not provided with a side wall. This edge lies upon an inturned flange 26 of the body in the closed position of the cabinet.

It should be understood that as the cabinet is to be used for making terminal connections or as a fuse box, then certain structure for retaining conductors or cable and for holding terminals would be included within the body or upon the closure. However, for purposes of clarity, as this structure forms no part of the present invention, it has not been illustrated in the drawings.

Figure 2:
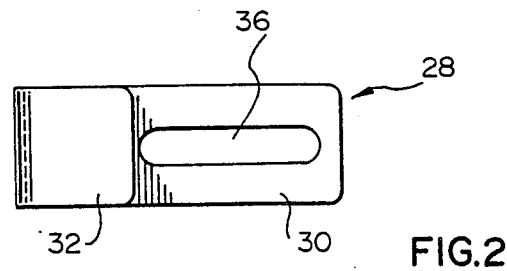
FIG. 2 is a plan view of a rigid stay incorporated in the container of FIG. 1.
Figure 3:
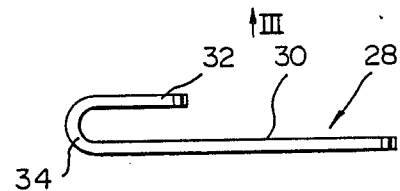
FIG. 3 is a side elevational view of the stay taken in the direction of arrow III in FIG. 2.

The cabinet is provided with a rigid stay 28 for holding the closure in an open pivoted position when this is required for maintenance or other work to be performed within the cabinet. As shown in FIG. 1, the rigid stay 28 is mounted upon the side wall 17 of the body. The rigid stay is shown to larger scale and in greater detail in FIGS. 2 and 3. As shown in FIGS. 2 and 3, the rigid stay 28 is basically of U-shape with two legs 30 and 32 spaced apart by a base 34 of the U. The leg 30 is substantially longer than the leg 32. The leg 30 is provided with a longitudinally extending slot 36. As shown by FIG. 1 and more particularly by FIG. 4, the rigid stay 28 is held to the wall 17 by a pin 37 mounted upon the wall and extending inwardly of the cabinet body and through the slot 36. Between a head 38 of the pin and the leg 30 is provided a compression spring 40 which urges the rigid stay towards and into engagement with the wall 17. As can be seen from FIG. 4, the stay 28 is oriented so that the leg 32 faces towards the side wall 17 so as to engage it.

Because of the method of mounting of the stay upon the side wall 17, the stay is movable both longitudinally by sliding movement along the pin 37 and also rotationally around the pin. In the stored position of the rigid stay, it is as shown in full outline in FIG. 4.

To retain the closure in an open position, the closure needs to be open completely so that the side wall 22 hinges around the hinge axis upon side wall 17 until the two side walls lie side-by-side as shown in FIG. 4. With the closure in this position, the stay 28 is moved in two directions, namely in a pivotal direction, as shown by arrow 42 in FIG. 4, and in a longitudinal direction upon the pin 37 so that the base 34 of the stay is moved away from the pin. This enables the stay to be located in the chain dotted position 28a in FIG. 4 in which the stay extends outwardly from the side walls and from the hinge position. In this position 28a, the leg 32 lies beyond the side wall 17 so that the spring 40 presses the leg 30 into engagement with the side wall 17. This action of the spring causes the leg 32 to be aligned with the remote side of the side wall 22 of the closure. Thus a sliding movement of the stay inwardly of the cabinet to its operative position shown in FIG. 5 will cause the leg 32 to lie on the far side of the side wall 22 (FIG. 6). In this position, the two side walls 17 and 22 are contained between the two legs 30 and 32 of the stay with the base 34 of the stay extending partly around the hinge axis.

It will be appreciated that in the operative position of the stay shown in FIGS. 5 and 6, it is impossible for the closure to be moved out of its open pivotal position. The action of the spring 40 holds the leg 30 in close contact with the side wall 17 so that slippage of the stay out of its operative position is impossible. It is a simple matter to return the stay manually from the operative position to the stored position shown in full outline in FIG. 4 to enable the closure to be located once again in its closed pivotal position.

As may be seen from the above embodiment, the stay 28 is stored against a side wall of the cabinet and in its operative position lies closely against the side wall of the cabinet, around the hinge position and closely against the side wall of the closure. In this location, the stay does not limit in any way accessibility through the frontal opening of the cabinet for maintenance or constructional purposes.

Also, in the operative position of the stay (FIGS. 5 and 6), the closure wall 20 of the closure lies back in a plane parallel to the base 14 of the body 12 (i.e. parallel to a wall supporting the container). Thus the wall 20 faces and is completely exposed to an operator to enable him to install or maintain cable or equipment within the closure in addition to within the body of the cabinet.

What is claimed is:

1. A container having:
   a body comprising side walls defining an opening;
   a closure having a closure wall and at least one side wall extending from the closure wall, the side wall of the closure and a side wall of the body hingedly connected together about a hinge axis to enable the closure to move between a closed pivotal position in which the closure wall covers the opening to the body and an open pivotal position in which the closure is hinged away from the opening to the body; and
   a rigid stay operative for retaining the closure in said open pivotal position, the stay having two legs extending in spaced relationship from a base of the stay, one of the legs formed with a longitudinally extending slot, the stay being pivotally and slidably retained upon one of the side walls by a pin extending from said one side wall and through the slot with a spring means urging the stay towards the side wall and the stay being locatable in an operative position when the closure is in its open pivotal position with the hinged together side walls of the body and closure disposed between the two legs of the rigid stay.

2. A container having:
   a body comprising side walls defining an opening;
   a closure having a closure wall and at least one side wall extending from the closure wall, the side wall of the closure and a side wall of the body hingedly connected together about a hinge axis to enable the closure to move between a closed pivotal position in which the closure wall covers the opening to the body and an open pivotal position in which the closure is hinged away from the opening to the body; and
   a rigid stay operative for retaining the closure in said open pivotal position, the stay being U-shaped with two legs extending in spaced relationship from a base, one of the legs formed with a longitudinally extending slot, the stay being pivotally and slidably retained upon one of the side walls by a pin extending from said one side wall and through the slot with a spring means urging the stay towards the side wall and the stay is locatable in an operative position when the closure is in its open pivotal position with the base of the stay extending partly around the hinge axis and with the legs of the stay disposed one on each side of the two hinged together side walls.

* * * * *